May 29, 1934.  C. FASSINGER  1,960,734

BOLT

Filed May 16, 1933

INVENTOR
Charles Fassinger,
By Archworth Martin,
Attorney.

Patented May 29, 1934

1,960,734

UNITED STATES PATENT OFFICE 1,960,734

BOLT

Charles Fassinger, Pittsburgh, Pa., assignor to Oliver Iron & Steel Corporation, Pittsburgh, Pa., a corporation of Pennsylvania Application May 16, 1933, Serial No. 671,346

6 Claims. (Cl. 85—1)

My invention relates to bolts and more particularly to bolts especially suited for use in woodwork, such as carriage bolts, bolts for fastening sheathing boards, floor boards, etc., to the framework of railway cars. Bolts made according to this invention are, of course, suitable for use in various other ways.

One object of my invention is to provide a bolt that may be employed as a fastening for members of wood, with a minimum damage to the wood, and which will have a very snug fit with the wooden member, without splintering thereof.

Another object of my invention is to provide a bolt of generally simplified and improved form which will be water-tight and nevertheless not cut or tear the wood in a manner frequently experienced with bolts of this character.

Figure 1:
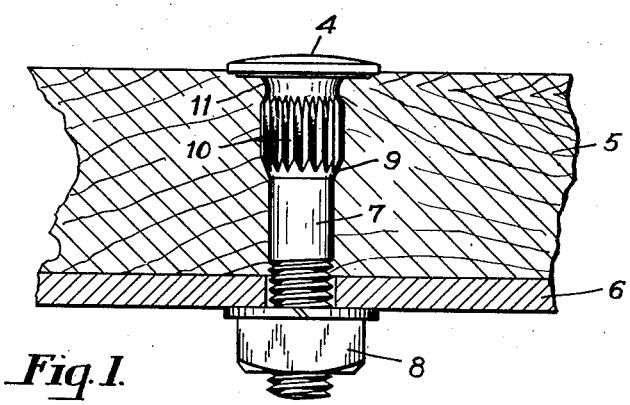
Figures 2, 3:
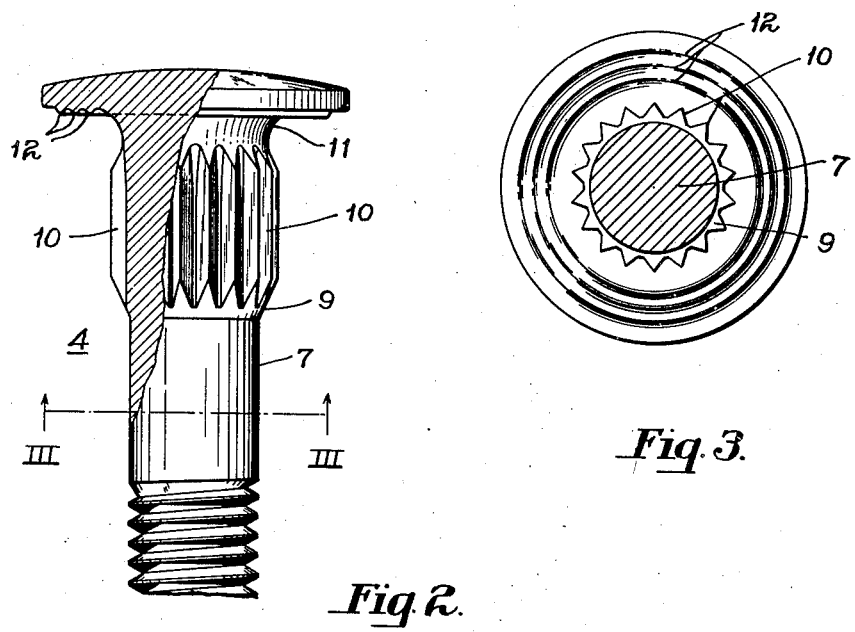

One form which my invention may take is shown in the accompanying drawing, wherein Figure 1 is a sectional view, showing the bolt in use; Fig. 2 is a view, on an enlarged scale, of a portion of the bolt of Fig. 1, and Fig. 3 is a view taken on the line III—III of Fig. 2.

The bolt is represented by the numeral 4, and is shown as employed to attach a wooden member 5 to a metal plate or frame member 6. The bolt is provided with a shank portion 7 that is threaded in the usual manner for the reception of a nut 8.

The bolt shank is of enlarged diameter as shown at 9, this shoulder-like enlargement being sloping or bevelled at its lower end to facilitate entry into the hole that extends through the board 5. Above the bevelled portion a series of vertically-extending ribs 10 are formed, the lower ends of these ribs being bevelled, so that when the bolt is forced into the bolt hole, the wood fibres will be pushed aside by the said sloping ends of the ribs, instead of being caught on the ends of the ribs and torn thereby.

That portion of the shank above the ribs 10 slopes or is curved as shown at 11, into the underside of the bolt head. The bolt head is provided on its underside with a series of concentric ribs 12 that are of shallow depth and are curved, so that they will not cut the wood fibres, but will merely compress the same on circular lines peripherally of the bolt shank.

The ribs 12 serve two functions—one of which is the prevention of radial displacement of the wood fibres which are compressed beneath the head of the bolt, and the other of which is to assist in making a water-tight fit of the bolt with the board 5. In using bolts of this kind there is tendency for the wood fibres to be broken and displaced to such an extent as to cause splintering of the wood in the vicinity of the bolt head. In the use of my bolt, the ribs 10, with the flutes formed between the same, prevent rotation of the bolt during screwing up of the nut 8.

As the bolt is driven or gradually drawn into the wood, the fibres will be compressed somewhat at the fillet-like curved surface 11. The ribs 12, as above-explained, resist radial displacement of the wood fibres in directions away from the shank of the bolt. In addition to thereby preventing splintering of the wood, they also assist in effecting a compact fit between the wood and that portion of the bolt in the vicinity of the surface 11.

The bevelling of the upper ends of the ribs 10 permits convenient withdrawal of the bolts from wood planks, with lessened danger of tearing and splintering the planks, and also permits the wood fibres which have been pushed aside by the ribs during insertion of the bolt to spring toward the curved surface 11, and assist in compactly filling the space beneath the bolt head.

I claim as my invention:—

1. A bolt having a head portion and a shank portion, that part of the shank in the vicinity of the head having a minimum diameter greater than the diameter of the remainder of the shank and having vertically-extending ribs, the lower edge of said part and the lower ends of the ribs being bevelled.

2. A bolt having a head portion and a shank portion, that part of the shank in the vicinity of the head having a minimum diameter greater than the diameter of the remainder of the shank and having vertically-extending ribs, the upper ends of the ribs and the lower ends thereof being bevelled.

3. A bolt having a head portion and a shank portion, the shank portion at its plane of juncture with the head being of enlarged diameter and extending in lines curved toward the periphery of the said head, and a rib disposed on the under surface of the head along a line disposed circumferentially of the shank.

4. A bolt having a head portion and a shank portion, the shank portion at its plane of juncture with the head being of enlarged diameter and extending in lines curved toward the periphery of the said head, and a rib disposed on the under surface of the head along a line disposed circumferentially of the shank, the said rib being of curved form in cross section.

5. A bolt having a head portion and a shank portion, the shank portion at its plane of juncture with the head being of enlarged diameter and extending in lines curved toward the periphery of the said head, and means carried by the bolt head for resisting displacement of wood fibres by the said curved portion.

6. A bolt having a head portion and a shank portion, that part of the shank portion in the vicinity of the head having a minimum diameter greater than the diameter of the remainder of the shank and having vertically-extending ribs, and the shank at its plane of juncture with the head being of fillet-like form, on curved lines extending from the upper ends of the ribs toward the periphery of the bolt head.

CHARLES FASSINGER.